(12) United States Patent
Ye

(10) Patent No.: US 10,649,285 B2
(45) Date of Patent: May 12, 2020

(54) PIXEL STRUCTURE AND LCD PANEL

(71) Applicant: SHENZHEN CHINA STAR OPTOELECTRONICS SEMICONDUCTOR DISPLAY TECHNOLOGY CO., LTD., Guangdong (CN)

(72) Inventor: Yanxi Ye, Guangdong (CN)

(73) Assignee: SHENZHEN CHINA STAR OPTOELECTRONICS SEMICONDUCTOR DISPLAY TECHNOLOGY CO., LTD., Shenzhen (CN)

( * ) Notice: Subject to any disclaimer, the term of this patent is extended or adjusted under 35 U.S.C. 154(b) by 222 days.

(21) Appl. No.: 15/745,090

(22) PCT Filed: Dec. 6, 2017

(86) PCT No.: PCT/CN2017/114791
§ 371 (c)(1),
(2) Date: Jan. 15, 2018

(87) PCT Pub. No.: WO2019/085143
PCT Pub. Date: May 9, 2019

(65) Prior Publication Data
US 2019/0384124 A1    Dec. 19, 2019

(30) Foreign Application Priority Data

Nov. 2, 2017   (CN) .......................... 2017 1 1066159

(51) Int. Cl.
*G02F 1/1343*   (2006.01)
*G02F 1/1362*   (2006.01)
(Continued)

(52) U.S. Cl.
CPC ...... *G02F 1/134309* (2013.01); *G02F 1/1368* (2013.01); *G02F 1/136213* (2013.01);
(Continued)

(58) Field of Classification Search
USPC .......................................................... 345/87
See application file for complete search history.

(56) References Cited

U.S. PATENT DOCUMENTS

2010/0141886 A1* 6/2010 Lee .................... G02F 1/134363
349/141
2017/0242306 A1* 8/2017 Chang ............... G02F 1/134309

* cited by examiner

*Primary Examiner* — Deeprose Subedi
(74) *Attorney, Agent, or Firm* — Hemisphere Law, PLLC; Zhigang Ma

(57) ABSTRACT

This invention discloses a pixel structure comprising: a scan line, and a data line, being crossed with the scan line to define a pixel unit. The pixel unit comprises a pixel electrode including a main body portion and a peripheral portion; a pixel driving element; and a common electrode disposed in an overlay structure with the pixel electrode. The common electrode forms a storage capacitor with the pixel electrode, and includes an outside portion adjacent to the data or scan line. The pixel electrode further includes an extension portion located outside the peripheral portion. The extension portion electrically connects the peripheral portion and forms an evading hole therebetween. The outside portion of the common electrode corresponds to the evading hole. The present invention further discloses a liquid crystal display panel. This invention has advantages of increasing the capacity of the storage capacitor and improving the parasitic capacitance and dark veins.

20 Claims, 2 Drawing Sheets

(51) Int. Cl.
*G02F 1/1368* (2006.01)
*G09G 3/36* (2006.01)
(52) U.S. Cl.
CPC ..... *G02F 1/136286* (2013.01); *G09G 3/3677* (2013.01); *G09G 3/3688* (2013.01); *G02F 2201/121* (2013.01); *G02F 2201/123* (2013.01); *G09G 2300/0426* (2013.01); *G09G 2300/0439* (2013.01)

PIXEL STRUCTURE AND LCD PANEL

RELATED APPLICATIONS

The present application is a National Phase of International Application Number PCT/CN2017/114791, filed Dec. 6, 2017, and claims the priority of China Application No. 201711066159.3, filed Nov. 2, 2017.

FIELD OF THE DISCLOSURE

The disclosure relates to a field of display technology, and more particularly to a pixel structure and a LCD panel.

BACKGROUND

Liquid Crystal Display (LCD) is one of the most widely used flat panel displays. There are various modes to realize image display, such as TN (twisted nematic liquid crystal) mode, IPS (In Plane Switching liquid crystal) mode crystal, and VA (Vertical Alignment liquid crystal) mode.

As a branch mode of the VA mode, there is a HVA mode which uses a powered light-alignment method to realize a liquid crystal layer with a certain pre-tilt angle in the PI surface, so as to omit traditional friction alignment.

To achieve a wide viewing angle of a liquid crystal display, the pixel electrode in the HVA mode adopts a Multi-Domain structure. FIG. 1 is a schematic diagram of a pixel structure in a prior art HVA mode. As shown in FIG. 1 and FIG. 2, the pixel structure includes a scan line 110 and a data line 120. The scan line 110 and the data line 120 cross each other to define a pixel unit. The pixel unit includes a pixel electrode 200 and a common electrode 140. The pixel electrode 200 includes a main body portion 210 and peripheral portion 220. The main body portion includes a first trunk electrode 211, a second trunk electrode 212, and branch electrodes 213. The first trunk electrode 211 is disposed laterally and the second trunk electrode 212 is longitudinally disposed. The centers of the first trunk electrode 211 and the second trunk electrode 212 perpendicularly intersect to form four display regions. A plurality of branch electrodes 213 are disposed in each display region, and a slit is formed between adjacent branch electrodes 213. The peripheral portion 220 has a shape of a mouth, and the peripheral portion 220 is connected to the distal end of the branch electrode 213. The common electrode 140 is located under the pixel electrode 200. The common electrode 140 forms a storage capacitor with the pixel electrode 200. The storage capacitor serves to hold the voltage in the pixel capacitor and reduce a voltage drop of the pixel capacitance caused by current leakage.

However, in the pixel structure described above, the storage capacitor has a relatively small overlapping area between the pixel electrode and the common electrode, so that the storage capacitor has a limited effect of holding the voltage in the pixel capacitor. In order to improve the technical problem, the prior art proposed a way that the pixel electrodes in FIG. 1 are expanded outward. The peripheral portion is thus closer to the scan line and the data line, and the lengths of the branch electrodes are outwardly increased. In this way, the overlapping area between the pixel electrode and the common electrode is increased, thereby increasing the storage capacitance. However, as the pixel electrode expands toward the scan line and the data line, parasitic capacitance between the pixel electrode and the scan line and the data line increases, thereby resulting in a poor display effect. Furthermore, since the pixel electrode expands toward the scan line and the data line, the pixel electrode is closer to a black matrix, on which a common electrode being provided, on the color filter substrate. The liquid crystal between the pixel electrode and the color filter substrate is influenced by the topography of the branch electrodes and the topography (slope) of the black matrix, which results in a disorder of a liquid crystal pre-deflection, and is easy to form dark veins.

SUMMARY

The technical problem to be solved by the embodiments of the present invention is to provide a pixel structure and a liquid crystal display panel that can increase the capacity of the storage capacitor and improve the problem of parasitic capacitance and dark veins.

In order to solve the above technical problem, an embodiment of a first aspect of the present invention provides a pixel structure, comprising:

a scan line extending in a lateral direction; and a data line extending in a longitudinal direction, the data line and the scan line crossing each other to define a pixel unit, the pixel unit comprising:

a pixel electrode including a main body portion and a peripheral portion, the peripheral portion surrounding the main body portion and electrically connected to the main body portion;

a pixel driving element electrically connecting the pixel electrode to the scan line and the data line, respectively; and a common electrode disposed in an overlay structure with the pixel electrode, the common electrode and the pixel electrode forming a storage capacitor, and the common electrode including an outside portion adjacent to the data line or/and the scan line; wherein, the pixel electrode further includes an extension portion located outside the peripheral portion, the extension portion is electrically connected to the peripheral portion and forms an evading hole therebetween, and the outside portion of the common electrode corresponds to the evading hole.

The outside portion of the common electrode includes a longitudinal portion disposed adjacent to a data line surrounding the pixel unit. The extension portion includes a longitudinal extension that forms a longitudinal evading hole with the peripheral portion. The longitudinal portion of the common electrode corresponds to the evading hole.

The longitudinal portion includes a first longitudinal portion and a second longitudinal portion respectively disposed adjacent to two data lines surrounding the pixel unit. The longitudinal extension including a first longitudinal extension and a second longitudinal extension. The first longitudinal extension forming a longitudinal first evading hole with the peripheral portion, and the first longitudinal portion corresponds to the first evading hole. The second longitudinal extension and the peripheral portion form a longitudinal second evading hole, and the second longitudinal portion corresponds to the second evading hole.

The extension portion further comprises a second lateral extension respectively connecting the first longitudinal extension and the second longitudinal extension at one end away from the pixel driving element. The second lateral extension and the peripheral portion form a lateral fourth evading hole.

The outside portion of the common electrode includes a first lateral portion provided adjacent to the pixel driving element. The extension portion includes a first lateral extension that forms a lateral third evading hole with the peripheral portion. The first lateral portion of the common electrode corresponds to the third evading hole.

The pixel electrode further includes a connecting bridge connecting an end of the extension portion and an end of the peripheral portion.

The angle between the connecting bridge and a horizontal line is 30°~60°.

The extension portion is formed of an elongated electrode, and the peripheral portion is of a mouth shape.

The main body portion of the pixel electrode includes a first trunk electrode, a second trunk electrode, and branch electrodes. The first trunk electrode and the second trunk electrode intersect perpendicularly. The branch electrodes connect the first trunk electrode or the second trunk electrode respectively, and form a slit by two adjacent branch electrodes.

A second aspect of the present invention provides a liquid crystal display panel, which includes the above pixel structure.

The implementation of the embodiment of the present invention has the following beneficial effects.

Since the pixel electrode further includes an extension portion outside the peripheral portion, the capacity of the storage capacitor formed by the pixel electrode and the common electrode is increased due to the provision of the extension portion, which in turn benefits a holding of the voltage on the pixel capacitor. Moreover, due to an evading hole formed between the extension portion and the peripheral portion, a parasitic capacitance due to the provision of the extension portion, such as the parasitic capacitance between the pixel electrode and the data line or the parasitic capacitance between the pixel electrode and the scan line, does not increase much. A better display effect is thus obtained. Moreover, since there are no slits formed by the branch electrodes in the area of the evading hole, a pre-deflection of the liquid crystal molecules in the liquid crystal layer above the slits is not easy to be disordered, and dark veins will not be formed. This in turn shows a better display effect.

BRIEF DESCRIPTION OF THE DRAWINGS

Accompanying drawings are for providing further understanding of embodiments of the disclosure. The drawings form a part of the disclosure and are for illustrating the principle of the embodiments of the disclosure along with the literal description. Apparently, the drawings in the description below are merely some embodiments of the disclosure, a person skilled in the art can obtain other drawings according to these drawings without creative efforts. In the figures.

DETAILED DESCRIPTION OF PREFERRED EMBODIMENTS

In order to understand the above objectives, features and advantages of the present disclosure more clearly, the present disclosure is described in detail below with references to the accompanying drawings and specific embodiments. However, the specific structural and functional details disclosed herein are only representative and are intended for describing exemplary embodiments of the disclosure. All other embodiments obtained by persons of ordinary skill in the art based on the embodiments of the present invention without creative efforts shall fall within the protection scope of the present invention.

The terms "comprising" and "having," as well as any variations thereof, appearing in the specification, claims and drawings, are intended to cover the inclusion of non-exclusive. For example, a process, method, system, product, or device that incorporates a series of steps or units is not limited to the steps or units listed but may optionally further include steps or units not listed or may optionally further include other steps or units inherent to these processes, methods, products or devices. In addition, the terms "first", "second" and "third" are used to distinguish different objects and are not intended to describe a specific order.

Figure 1:
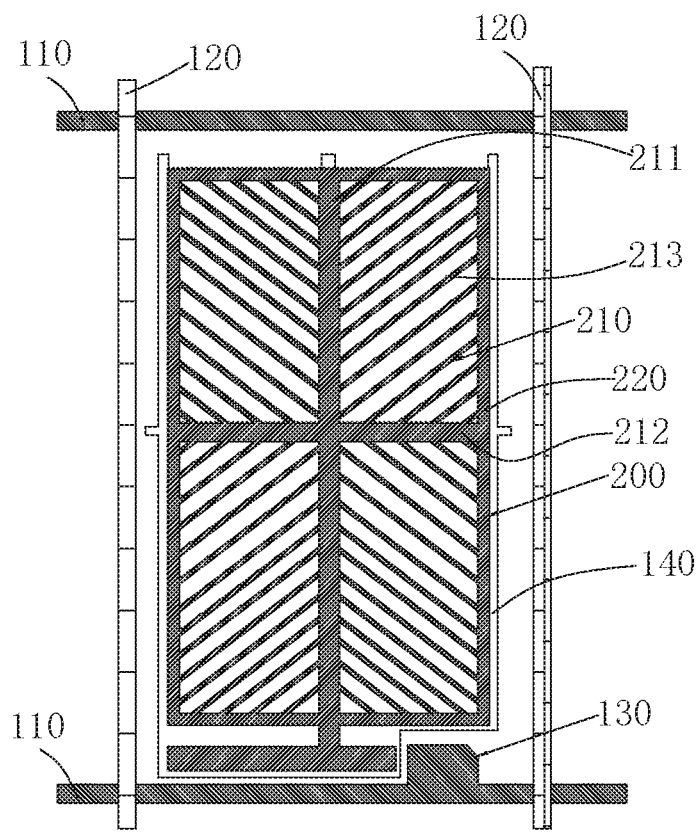
FIG. 1 is a schematic diagram of a prior art pixel structure.
Figure 2:
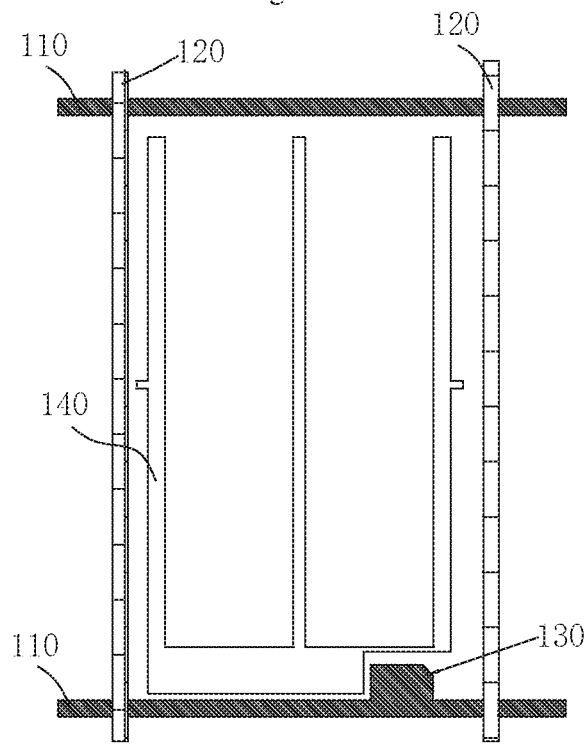
FIG. 2 is a schematic diagram of the pixel structure of FIG. 1 after removing the pixel electrode.
Figure 3:
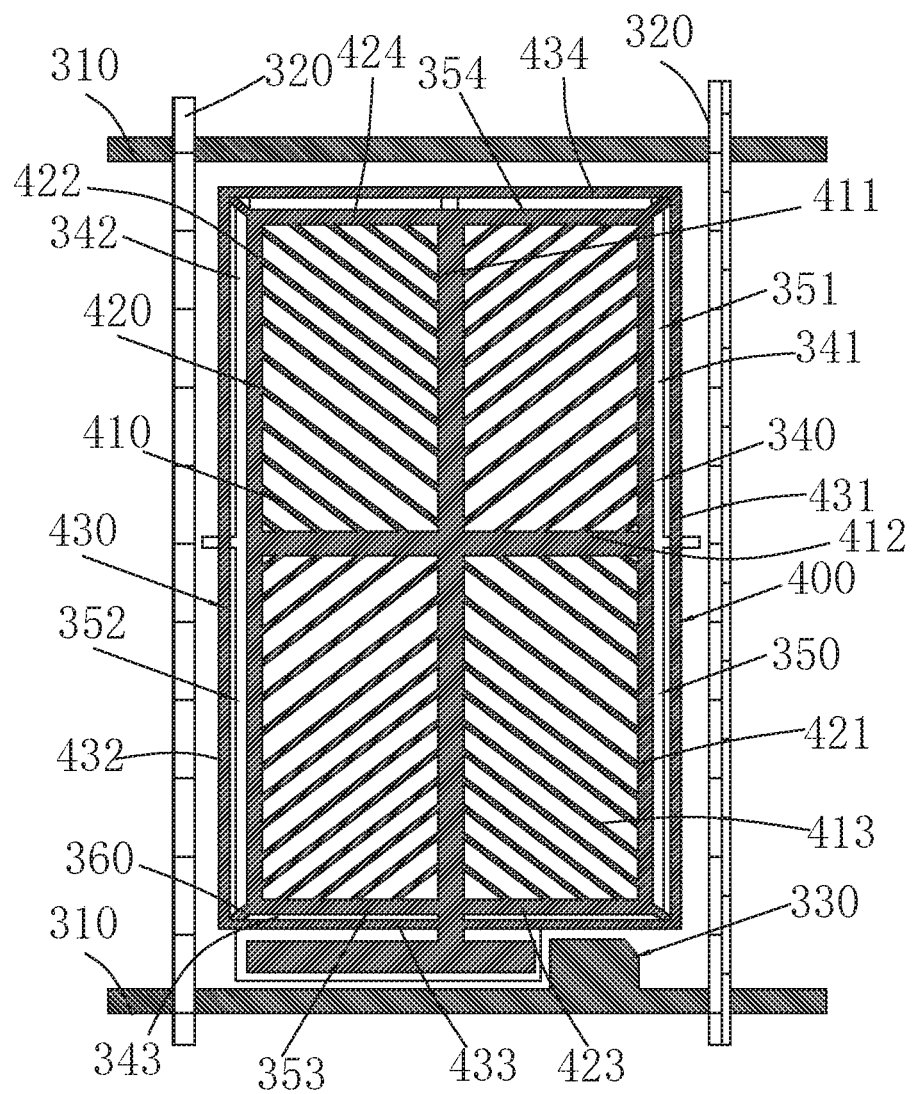
FIG. 3 is a schematic diagram of a pixel structure according to an embodiment of the present invention.

An embodiment of the present invention provides a pixel structure. Referring to FIG. 3, the pixel structure includes a scan line 310 and a data line 320. The scan line 310 extends in a lateral direction. The data line 320 extends in a vertical direction. Two scan lines 310 and two data lines 320 cross each other to define a pixel unit including a pixel electrode 400, pixel driving element 330, and a common electrode 340.

In this embodiment, the pixel electrode 400 is made of an ITO material. The pixel electrode 400 includes a main body portion 410 and a peripheral portion 420. The main body portion 410 includes a first trunk electrode 411, a second trunk electrode 412, and branch electrodes 413. The first trunk electrode 411 is longitudinally disposed, the second trunk electrode 412 is laterally disposed, and the centers of the first trunk electrode 411 and the second trunk electrode 412 are perpendicularly intersected to form four display regions (4 domains). There are a plurality of branch electrodes 413 disposed in each display region. The branch electrodes 413 are electrically connected to the first trunk electrode 411 or the second trunk electrode 412 respectively. There are a slit formed between two adjacent branch electrodes 413. In the present embodiment, the peripheral portion 420 is provided around the main body portion 410 and electrically connected to the main body portion 410. Specifically, the peripheral portion 420 has a mouth shape, and connects with outer ends of the branch electrodes. The inner ends of the branch electrodes 413 are electrically connected to the trunk electrodes. In this embodiment, the pixel electrode 400 and a liquid crystal layer and the common electrode thereon form a pixel capacitor.

In this embodiment, the pixel electrode 400 is electrically connected to the scan line 310 and the data line 320 through the pixel driving element 330, representing by a gate of the pixel driving element in the figure. The pixel driving element 330 is a thin film transistor. However, the present invention is not limited to that. In other embodiments of the present invention, the pixel driving element can also be a MOS transistor.

In the present embodiment, the common electrode 340 and the pixel electrode 400 are arranged in different layers. Specifically, the common electrode 340 and the scan line 310 are located on a same layer. The pixel electrode 400 is located above the common electrode 340. The pixel electrode 400 and the common electrodes 340 are separated by a plurality of layers, such as a gate insulating layer, a semiconductor layer, a planarization layer, and the like. Of course, in other embodiments of the present invention, they can be separated by a gate insulating layer, a semiconductor layer, a planarization layer, and a color resist layer, which means the array substrate in this case is a COA array substrate. In this embodiment, the common electrode 340 forms a storage capacitor with the pixel electrode 400. The storage capacitor is used to hold a voltage in the pixel capacitor and reduce a voltage drop of the pixel capacitor due to a current leakage. In this embodiment, the common electrode 340 includes an outside portion disposed adjacent to the data line 320 or/and the scan line 310.

In order to increase the capacity of the storage capacitor, in this embodiment, the pixel electrode 400 further includes an extension portion 430 located outside the peripheral portion 420. In this embodiment, the extension portion 430 has a mouth shape, and the extension portion 430 and the peripheral portion 420 are together formed a shape of double mouths. The extension portion 430 is a mouth shape, and the peripheral portion 420 is also a mouth shape inside the extension portion 430. The extension portion 430 is electrically connected to the peripheral portion 420. In this embodiment, an evading hole 350 is formed between the extension portion 430 and the peripheral portion 420. The outside portion of the common electrode 340 corresponds to the evading hole 350. Here, the so-called "correspondence" refers to a projection of most of the outside portion of the common electrode 340 in a horizontal plane is located in a projection of the evading hole 350 in the horizontal plane. The so-called "most" refers to a 60% above of the area of the projection of the outside portion in the horizontal plane is located in the projection of the evading hole 350 in the horizontal plane. In this embodiment, the outside portion is in a shape of "U".

Since the pixel electrode 400 further includes the extension portion 430 located outside the peripheral portion 420, the capacity of the storage capacitor formed by the pixel electrode 400 and the common electrode 340 is increased due to the extension portion 430 added, which in turn facilitates a holding of the voltage in the pixel capacitor. Since the evading hole 350 is formed between the extension portion 430 and the peripheral portion 420, the parasitic capacitance due to the arrangement of the extension portion 430 does not increase much. For example, parasitic capacitance between the pixel electrode 400 and the data line 320, or the parasitic capacitance between the pixel electrode 400 and the scan line 310 is much smaller than the parasitic capacitance increased by the way described in the background, and results in a better display effect. Furthermore, since the place where the evading hole is located does not have the slits formed by branch electrodes 413, the pre-deflection of the liquid crystal molecules in the liquid crystal layer above the slits is not easily disordered, and the dark veins are not easily formed, which in turn results in a better display effect.

In this embodiment, the extension portion 430 includes a longitudinal extension parallel to the data line 320. The longitudinal extension forms a longitudinal evading hole with the peripheral portion 420. The longitudinal evading hole 350 has a longitudinal shape. The outside portion of the common electrode 340 includes a longitudinal portion parallel to the data line 320 and corresponding to the longitudinal evading hole 350.

Specifically, in the present embodiment, the longitudinal extension includes a first longitudinal extension 431 and a second longitudinal extension 432. The first longitudinal extension 431 is disposed adjacent to the data line 320 on the right in FIG. 3. The second longitudinal extension 432 is disposed adjacent to the data line 320 on the left side in FIG. 3. The first longitudinal extension 431 and the peripheral portion 420 form a longitudinal first evading hole 351. The second longitudinal extension 432 and the peripheral portion 420 form a vertical second evading hole 352. In this embodiment, the longitudinal portion of the common electrode 340 includes a first longitudinal portion 341 disposed adjacent to the data line 320 on the right side in FIG. 3 and a second longitudinal portion 342 adjacent to the data line 320 on the left side of FIG. 3. The data line 320 on the left side and the data line 320 on the right side in FIG. 3 are respectively used to define pixel units. The first longitudinal portion 341 corresponds to the first evading hole 351. The second longitudinal portion 342 corresponds to the second evading hole 352. In other embodiments of the present invention, the longitudinal extension may further include only the first longitudinal extension or the second longitudinal extension. In other embodiments of the present invention, the longitudinal portion may include only the first longitudinal portion or the second longitudinal portion.

In the present embodiment, the extension portion 430 further includes a lateral extension parallel to the scan line 310. The lateral extension forms a lateral evading hole 353 with the peripheral portion 420. The outside portion of the common electrode 340 includes a lateral portion. The lateral portion of the common electrode 340 corresponds to the evading hole 353. In addition, in other embodiments of the present invention, the extension portion may not include the lateral extension.

Specifically, in the present embodiment, the lateral extension includes a first lateral extension 433 and a second lateral extension 434. The first lateral extension 433 connects the first longitudinal extension 431 and the second longitudinal extension 432 and is at an end near the pixel driving element 330, which is at a lower end in FIG. 3. The second lateral extension 434 connects the first longitudinal extension 431 and the second longitudinal extension 432 and is away from the end of the pixel driving element 330, which is at an upper end in FIG. 3. The first lateral extension 433 and the second lateral extension 434 are parallel to the scan line 310. In this embodiment, the first lateral extension 433 and the peripheral portion 420 form a lateral third evading hole 353, and the second lateral extension 434 and the peripheral portion 420 form a lateral fourth evading hole 354. In this embodiment, the outside portion of the common electrode 340 includes a first lateral portion 343 disposed adjacent to the pixel driving element 330. The first lateral portion 343 connects the first longitudinal portion 341 and the second longitudinal portion 342 at one end adjacent to the pixel driving element 330, which is the lower end in FIG. 3. The first lateral portion 343 of the common electrode 340 corresponds to the third evading hole 353. In this embodiment, the outside portion of the common electrode 340 does not include a second lateral portion corresponding to the fourth evading hole 354. Of course, in other embodiments of the present invention, in order to increase the storage capacitance, a second lateral portion corresponding to the fourth escape hole may further be included in the outside portion of the common electrode. In addition, in other embodiments of the present invention, since the common electrode does not have the second lateral portion, the lateral extension may not include the second lateral extension. In the present embodiment, the extension portion 430 is of a mouth shape, specifically a mouth shape formed by a first lateral extension 433, a second lateral extension 434, a first longitudinal extension 431, and a second longitudinal extension 432 connected together end to end.

In the present embodiment, the peripheral portion 420 has a mouth shape. Specifically, the peripheral portion 420 includes a first lateral peripheral portion 423, a second lateral peripheral portion 424, a first longitudinal peripheral portion 421, and a second longitudinal direction 422. The first lateral peripheral portion 423, the second lateral peripheral portion 424, the first longitudinal peripheral portion 421, and the second longitudinal peripheral portion 422 are connected end to end to form a mouth shape. In this embodiment, a first evading hole 351 formed between the first longitudinal peripheral portion 421 and the first longitudinal extension 431 and a second evading hole 352 is formed between the second longitudinal peripheral portion 422 and the second longitudinal extension 432. A third evading hole 353 is formed between the first lateral peripheral part 423 and the first lateral extension 433 and a fourth evading hole 354 is formed between the second lateral peripheral portion 424 and the second lateral extension 434.

In order to electrically connect the extending portion 430 with the peripheral portion 420 of the pixel electrode 400 and make the voltages of the two portions the same, in the present embodiment, the pixel electrode 400 further includes a connecting bridge 360 connecting the ends of the extending portion 430 and the ends of the peripheral portion 420. Specifically, the number of the connecting bridges 360 is four, and the connecting bridge 360 electrically connects the upper end and the lower end of the first longitudinal peripheral portion 421 and the first longitudinally extension 431, respectively. In the present embodiment, since the peripheral portion 420 and the extension portion 430 are formed in the shape of a double mouth, the connecting bridges 360 are connected to four corners of the double-mouth shape. In the present embodiment, the angle between the connecting bridge 360 and a horizontal line is 30° to 60°, for example, 30°, 35°, 40°, 45°, 50°, 55°, 60°, and the like. In this embodiment, since the connecting bridge 360 connects the end of the extension portion 430 and the end of the peripheral portion 420, the number of the connecting bridges 360 is less so that the connecting bridge 360 has a limited influence on the liquid crystal molecules thereon. Moreover, since the connecting bridge 360 is relatively evenly disposed between the extension portion 430 and the peripheral portion 420, the voltages on the extension portion 430 and the peripheral portion 420 are more uniform.

In this embodiment, both the extension portion 430 and the peripheral portion 420 are formed by elongated electrodes. That is, the first longitudinal peripheral portion 421, the first longitudinal extension 431, the second longitudinal peripheral portion 422, the second longitudinal extension 432, the first lateral peripheral portion 423, the first lateral extension 433, the second lateral peripheral portion 424, and the second lateral extension 434 are each formed by an elongated electrode. The number of slits formed in the elongated electrodes is 0. That is, the elongated electrode does not include a slit, so that the elongated electrode does not exert a great influence on the pre-deflection of the liquid crystal molecules thereon.

In addition, an embodiment of the present invention provides a liquid crystal display panel, which includes an array substrate, a filter substrate and a liquid crystal layer sandwiched therebetween. The array substrate including the pixel structure described above. The array substrate is a COA (Color Filter on Array) type of array substrate. In other embodiments of the present invention, the array substrate may also be a conventional array substrate. In this embodiment, the filter substrate includes an upper substrate, a black matrix, and a common electrode. The black matrix is formed on the upper substrate, the common electrode is formed on the upper substrate and the black matrix. The black matrix is an elongated shape. The sides of the black matrix are bevels. When the liquid crystal layer is sandwiched between the array substrate and the filter substrate, the side surfaces of the black matrix will have an effect to produce a pre-deflection on the liquid crystal molecules under the black matrix.

It should be noted that, each embodiment in this specification is described in a progressive manner, and each embodiment focuses on differences from other embodiments. The same and similar parts among the embodiments refer to each other. Since an apparatus embodiment is basically similar to a method embodiment, the description is relatively simple, and for the relevant parts, reference may be made to the part of the method embodiments.

Through the description of the above embodiments, the present invention has the following advantages.

Since the pixel electrode further includes an extension portion outside the peripheral portion, the capacity of the storage capacitor formed by the pixel electrode and the common electrode is increased due to the provision of the extension portion, which in turn benefits a holding of the voltage on the pixel capacitor. Moreover, due to an evading relief hole formed between the extension portion and the peripheral portion, a parasitic capacitance due to the provision of the extension portion, such as the parasitic capacitance between the pixel electrode and the data line or the parasitic capacitance between the pixel electrode and the scan line, does not increase much. A better display effect is thus obtained. Moreover, since there are no slits formed by the branch electrodes at the evading hole, a pre-deflection of the liquid crystal molecules in the liquid crystal layer above the slits is not easy to be disordered, and dark veins will not be formed which shows a better display effect.

The foregoing contents are detailed description of the disclosure in conjunction with specific preferred embodiments and concrete embodiments of the disclosure are not limited to these description. For the person skilled in the art of the disclosure, without departing from the concept of the disclosure, simple deductions or substitutions can be made and should be included in the protection scope of the application.

What is claimed is:

1. A pixel structure, comprising:
a scan line extending in a lateral direction; and
a data line extending in a longitudinal direction, the data line and the scan line crossing each other to define a pixel unit, the pixel unit comprising:
a pixel electrode including a main body portion and a peripheral portion, the peripheral portion surrounding the main body portion and electrically connected to the main body portion;
a pixel driving element electrically connecting the pixel electrode to the scan line and the data line, respectively; and
a common electrode disposed in an overlay structure with the pixel electrode, the common electrode and the pixel electrode forming a storage capacitor, and the common electrode including an outside portion adjacent to the data line or/and the scan line; wherein,
the pixel electrode further includes an extension portion located outside the peripheral portion, the extension portion is directly connected to the peripheral portion and forms an evading hole therebetween, and the outside portion of the common electrode corresponds to the evading hole such that the outside portion of the common electrode is exposed through the evading hole.

2. The pixel structure as claimed in claim 1, wherein the outside portion of the common electrode includes a longitudinal portion disposed adjacent to a data line surrounding the pixel unit, the extension portion includes a longitudinal extension that forms a longitudinal evading hole with the peripheral portion, and the longitudinal portion of the common electrode corresponds to the evading hole.

3. The pixel structure as claimed in claim 2, wherein the longitudinal portion includes a first longitudinal portion and a second longitudinal portion respectively disposed adjacent to two data lines surrounding the pixel unit, and wherein the longitudinal extension includes a first longitudinal extension and a second longitudinal extension, the first longitudinal extension forms a longitudinal first evading hole with the peripheral portion, the first longitudinal portion corresponds to the first evading hole, the second longitudinal extension and the peripheral portion form a longitudinal second evading hole, and the second longitudinal portion corresponds to the second evading hole.

4. The pixel structure as claimed in claim 3, wherein the extension portion further comprises a second lateral extension respectively connecting the first longitudinal extension and the second longitudinal extension at one end away from the pixel driving element, and the second lateral extension and the peripheral portion form a lateral fourth evading hole.

5. The pixel structure as claimed in claim 3, wherein the outside portion of the common electrode includes a first lateral portion provided adjacent to the pixel driving element, the extension portion includes a first lateral extension that forms a lateral third evading hole with the peripheral portion, and the first lateral portion of the common electrode corresponds to the third evading hole.

6. The pixel structure as claimed in claim 1, wherein the pixel electrode further includes a connecting bridge connecting an end of the extension portion and an end of the peripheral portion.

7. The pixel structure as claimed in claim 2, wherein the pixel electrode further includes a connecting bridge connecting an end of the extension portion and an end of the peripheral portion.

8. The pixel structure as claimed in claim 6, wherein the angle between the connecting bridge and a horizontal line is 30°~60°.

9. The pixel structure as claimed in claim 1, wherein the extension portion is formed of an elongated electrode, and the peripheral portion is a mouth shape.

10. The pixel structure as claimed in claim 1, wherein the main body portion of the pixel electrode includes a first trunk electrode, a second trunk electrode, and branch electrodes, the first trunk electrode and the second trunk electrode intersect perpendicularly, the branch electrodes connect the first trunk electrode or the second trunk electrode respectively, and form a slit by two adjacent branch electrodes.

11. A liquid crystal display panel including a pixel structure, which comprises:
a scan line extending in a lateral direction; and
a data line extending in a longitudinal direction, the data line and the scan line crossing each other to define a pixel unit, the pixel unit comprising:
a pixel electrode including a main body portion and a peripheral portion, the peripheral portion surrounding the main body portion and electrically connected to the main body portion;
a pixel driving element electrically connecting the pixel electrode to the scan line and the data line, respectively; and
a common electrode disposed in an overlay structure with the pixel electrode, the common electrode and the pixel electrode forming a storage capacitor, and the common electrode including an outside portion adjacent to the data line or/and the scan line; wherein,
the pixel electrode further includes an extension portion located outside the peripheral portion, the extension portion is directly connected to the peripheral portion and forms an evading hole therebetween, and the outside portion of the common electrode corresponds to the evading hole such that the outside portion of the common electrode is exposed through the evading hole.

12. The pixel structure as claimed in claim 11, wherein the outside portion of the common electrode includes a longitudinal portion disposed adjacent to a data line surrounding the pixel unit, the extension portion includes a longitudinal extension that forms a longitudinal evading hole with the peripheral portion, and the longitudinal portion of the common electrode corresponds to the evading hole.

13. The pixel structure as claimed in claim 12, wherein the longitudinal portion includes a first longitudinal portion and a second longitudinal portion respectively disposed adjacent to two data lines surrounding the pixel unit, and wherein the longitudinal extension includes a first longitudinal extension and a second longitudinal extension, the first longitudinal extension forms a longitudinal first evading hole with the peripheral portion, the first longitudinal portion corresponds to the first evading hole, the second longitudinal extension and the peripheral portion form a longitudinal second evading hole, and the second longitudinal portion corresponds to the second evading hole.

14. The pixel structure as claimed in claim 13, wherein the extension portion further comprises a second lateral extension respectively connecting the first longitudinal extension and the second longitudinal extension at one end away from the pixel driving element, and the second lateral extension and the peripheral portion form a lateral fourth evading hole.

15. The pixel structure as claimed in claim 13, wherein the outside portion of the common electrode includes a first lateral portion provided adjacent to the pixel driving element, the extension portion includes a first lateral extension that forms a lateral third evading hole with the peripheral portion, and the first lateral portion of the common electrode corresponds to the third evading hole.

16. The pixel structure as claimed in claim 11, wherein the pixel electrode further includes a connecting bridge connecting an end of the extension portion and an end of the peripheral portion.

17. The pixel structure as claimed in claim 12, wherein the pixel electrode further includes a connecting bridge connecting an end of the extension portion and an end of the peripheral portion.

18. The pixel structure as claimed in claim 16, wherein the angle between the connecting bridge and a horizontal line is 30°~60°.

19. The pixel structure as claimed in claim 11, wherein the extension portion is formed of an elongated electrode, and the peripheral portion is a mouth shape.

20. The pixel structure as claimed in claim 11, wherein the main body portion of the pixel electrode includes a first trunk electrode, a second trunk electrode, and branch electrodes, the first trunk electrode and the second trunk electrode intersect perpendicularly, the branch electrodes connect the first trunk electrode or the second trunk electrode respectively, and form a slit by two adjacent branch electrodes.

* * * * *